(12) United States Patent
Campbell

(10) Patent No.: US 8,528,443 B2
(45) Date of Patent: Sep. 10, 2013

(54) ACCELERATOR PEDAL FOR A VEHICLE AND MOUNTING RACK THEREFOR

(75) Inventor: Andrew Campbell, Scotland (GB)

(73) Assignee: CTS Corporation, Elkhart, IN (US)

( * ) Notice: Subject to any disclaimer, the term of this patent is extended or adjusted under 35 U.S.C. 154(b) by 131 days.

(21) Appl. No.: 13/049,271

(22) Filed: Mar. 16, 2011

(65) Prior Publication Data

US 2011/0162481 A1    Jul. 7, 2011

Related U.S. Application Data

(63) Continuation-in-part of application No. 11/657,926, filed on Jan. 24, 2007, now Pat. No. 8,042,430, which is a continuation-in-part of application No. 10/854,837, filed on May 27, 2004, now Pat. No. 7,404,342.

(60) Provisional application No. 61/315,078, filed on Mar. 18, 2010.

(51) Int. Cl.
   *G05G 1/30*    (2008.04)
(52) U.S. Cl.
   USPC .......................................................... 74/513
(58) Field of Classification Search
   USPC ........................................... 74/512, 513, 560
   See application file for complete search history.

(56) References Cited

U.S. PATENT DOCUMENTS

| | | |
|---|---|---|
| 3,885,449 A | 5/1975 | Green |
| 4,944,269 A | 7/1990 | Imoehl |
| 5,013,930 A | 5/1991 | Spakowski et al. |
| RE34,302 E | 7/1993 | Imoehl |
| 5,408,899 A | 4/1995 | Stewart |
| 5,416,295 A | 5/1995 | White et al. |
| 5,497,677 A | 3/1996 | Baumann et al. |
| 5,524,589 A | 6/1996 | Kikkawa et al. |
| 5,666,860 A | 9/1997 | Baumann et al. |
| 5,697,260 A | 12/1997 | Rixon et al. |
| 5,768,946 A * | 6/1998 | Fromer et al. .................. 74/514 |
| 5,937,707 A | 8/1999 | Rixon et al. |
| 6,003,404 A | 12/1999 | Hannewald |
| 6,070,490 A | 6/2000 | Aschoff et al. |
| 6,073,610 A | 6/2000 | Matsumoto et al. |
| 6,098,971 A | 8/2000 | Stege et al. |
| 6,158,299 A | 12/2000 | Czajkowski |
| 6,289,762 B1 | 9/2001 | Silva |
| 6,330,838 B1 | 12/2001 | Kalsi |
| 6,336,377 B1 | 1/2002 | Reimann et al. |

(Continued)

FOREIGN PATENT DOCUMENTS

| | | |
|---|---|---|
| DE | 44 07 005 | 3/1995 |
| DE | 44 26 549 | 2/1996 |

(Continued)

*Primary Examiner* — Vicky Johnson
(74) *Attorney, Agent, or Firm* — Daniel J. Deneufbourg

(57) ABSTRACT

A pedal assembly including a rack for mounting the pedal assembly to the wall of a vehicle. In one embodiment, the rack includes a plate with at least one clip bracket, a locating pin aperture, and a pair of mounting apertures. The plate is coupled to the pedal assembly in a relationship wherein the clip bracket receives a mounting clip formed on the pedal assembly, the locating pin aperture receives a locating pin formed on the pedal assembly, and the mounting apertures in the plate are aligned with respective mounting apertures defined on the pedal assembly and receive fasteners which secure the rack to the pedal.

5 Claims, 11 Drawing Sheets

(56) References Cited

U.S. PATENT DOCUMENTS

| | | | |
|---|---|---|---|
| 6,360,631 | B1 | 3/2002 | Wortmann et al. |
| 6,418,813 | B1 | 7/2002 | Lewis |
| 6,426,619 | B1 | 7/2002 | Pfaffenberger et al. |
| 6,446,526 | B2 | 9/2002 | Reimann et al. |
| 6,474,191 | B1 | 11/2002 | Campbell |
| 6,523,433 | B1 | 2/2003 | Staker |
| 6,553,863 | B1 * | 4/2003 | Djordjevic .................. 74/512 |
| 6,658,963 | B2 | 12/2003 | Yaddehige |
| 6,689,016 | B2 | 2/2004 | Apel |
| 6,745,642 | B2 | 6/2004 | Kumamoto et al. |
| 6,758,114 | B2 | 7/2004 | Sundaresan et al. |
| 6,809,512 | B2 | 10/2004 | Pfaffenberger |
| 6,834,564 | B2 * | 12/2004 | Huesges et al. ............ 74/513 |
| 6,860,170 | B2 | 3/2005 | DeForest |
| 6,951,152 | B2 * | 10/2005 | Strole ......................... 74/512 |
| 2002/0152831 | A1 | 10/2002 | Sakamoto et al. |
| 2003/0029267 | A1 * | 2/2003 | Aoki et al. .................. 74/560 |
| 2004/0237700 | A1 | 12/2004 | Wurn |
| 2005/0034555 | A1 | 2/2005 | Staker |
| 2005/0145058 | A1 | 7/2005 | Kohlen et al. |
| 2008/0236987 | A1 * | 10/2008 | Eckerle et al. ............ 192/219.5 |
| 2008/0276750 | A1 | 11/2008 | Kim et al. |

FOREIGN PATENT DOCUMENTS

| | | |
|---|---|---|
| DE | 195 04 971 | 8/1996 |
| DE | 198 11 442 | 3/1998 |
| DE | 29801560 U1 * | 6/1998 |
| DE | 197 01 637 | 7/1998 |
| DE | 101 35 537 | 1/2003 |
| DE | 299 07 092 | 5/2005 |
| DE | 102004047711 | 5/2005 |
| DE | 10 2005 053665 | 5/2007 |
| DE | 10 2005 057598 | 6/2007 |
| DE | 10 2006 056676 | 9/2008 |
| EP | 0 670 235 | 9/1995 |
| EP | 0 748 713 | 12/1996 |
| EP | 0 926 581 | 6/1999 |
| EP | 0 899 147 | 9/1999 |
| EP | 0 974 886 | 1/2000 |
| EP | 1 033 275 | 9/2000 |
| EP | 1 154 346 | 11/2001 |
| FR | 2 138 249 | 1/1973 |
| WO | WO 01/14161 | 3/2001 |
| WO | WO 01/81110 | 11/2001 |
| WO | WO 2004/107079 | 12/2004 |

* cited by examiner

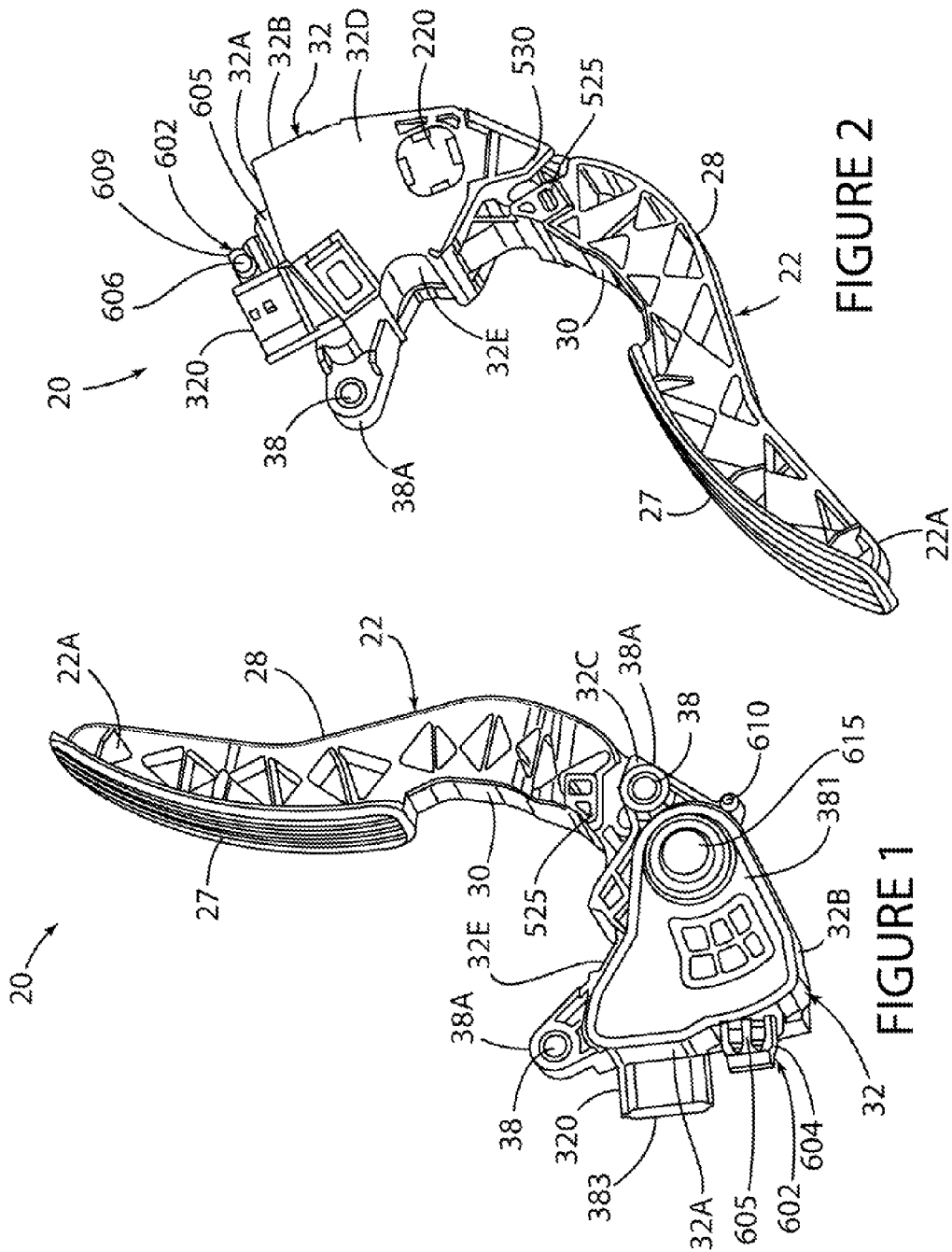

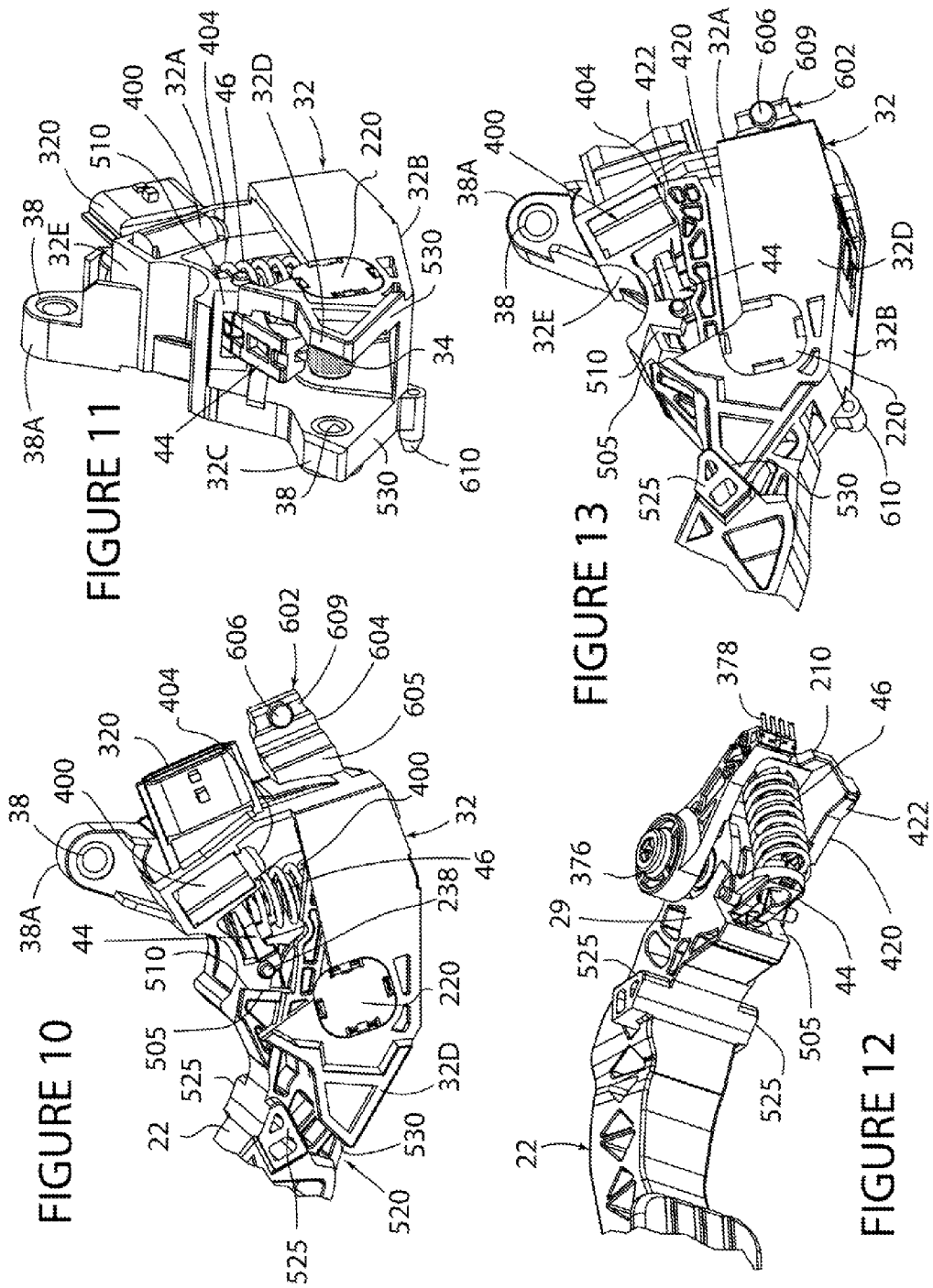

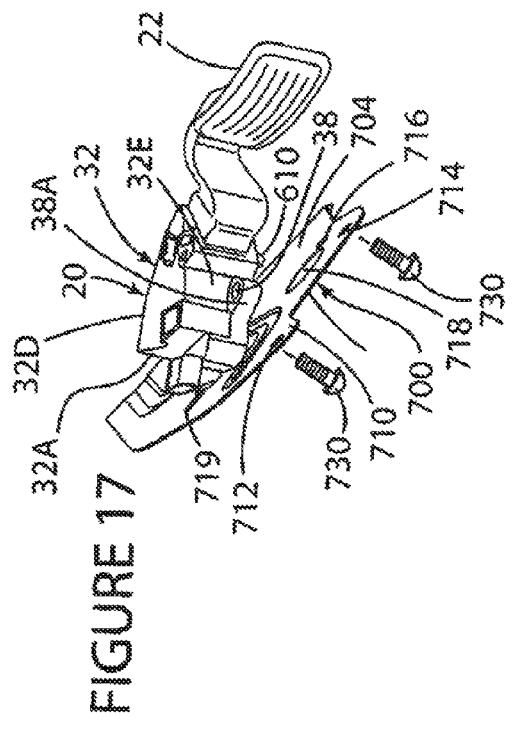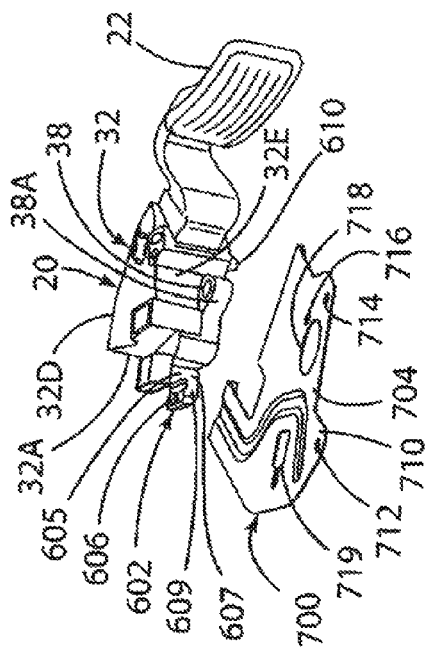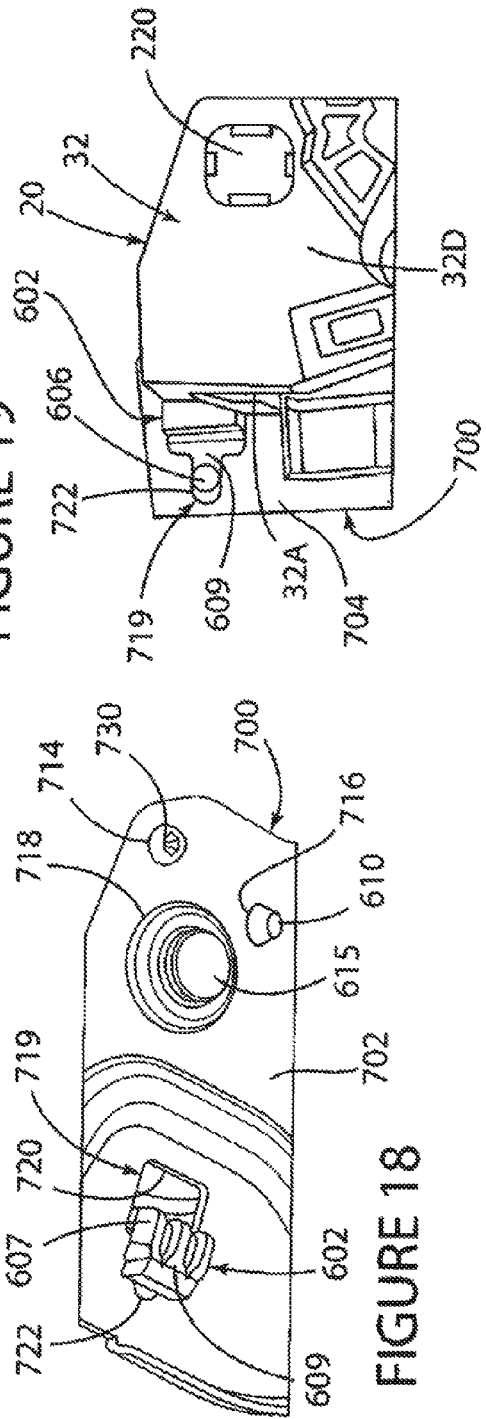

ACCELERATOR PEDAL FOR A VEHICLE AND MOUNTING RACK THEREFOR

CROSS-REFERENCE TO RELATED APPLICATIONS

This application claims the benefit of the filing date and disclosure of U.S. Provisional Application Ser. No. 61/315,078, filed on Mar. 18, 2010 and is a continuation-in-part application of U.S. application Ser. No. 11/657,926 filed on Jan. 25, 2007, which is a continuation-in-pail of U.S. application Ser. No. 10/854,837, filed on May 27, 2004, now U.S. Pat. No. 7,404,342 which issued on Jul. 29, 2008, the disclosures of which are explicitly incorporated herein by reference as are all references cited therein.

FIELD OF THE INVENTION

This invention relates to an accelerator pedal and, in particular, to a mounting rack for an accelerator pedal.

BACKGROUND OF THE INVENTION

Accelerator pedals are fastened to the floor and/or wall of a vehicle. Currently, the housing of certain of the pedals in use today incorporates at least three mounting through-holes adapted to receive respective fasteners which extend through the mounting through-holes and into the wall of the vehicle floor.

Although this mounting means has proven satisfactory, there continues to be a need to improve the designs of the pedals in use today including a continued need to improve the means and assembly for fastening pedals to the vehicle.

SUMMARY OF THE INVENTION

A pedal assembly is disclosed including a rack for mounting the pedal assembly to the wall of a vehicle. In one embodiment, the rack comprises a plate including means for clipping the rack to the pedal assembly and at least one mounting aperture in the plate adapted for alignment with a corresponding mounting aperture on the pedal assembly.

In one embodiment, the means for clipping the rack to the pedal assembly comprises a clip bracket in the form of a clip receiving aperture which is defined in the plate and is adapted to receive a clip which is formed on the pedal assembly. First and second mounting apertures are defined in the plate and adapted for alignment with corresponding first and second mounting apertures defined on the pedal assembly and adapted to receive first and second fasteners for securing the plate to the pedal assembly. A locating pin aperture is also defined in the plate and is adapted to receive a locating pin on the pedal assembly. In one embodiment, the clip is a generally L-shaped arm adapted to extend through the clip receiving aperture and into abutting relationship with one of the opposing faces of the plate.

In one embodiment, a combination pedal and pedal rack assembly comprises a pedal which includes a housing which has at least a first mounting aperture defined therein and a first means for clipping the housing to the pedal rack, and a pedal rack assembly which includes a plate which has a second means associated therewith and cooperates with the first means on the housing of the pedal for clipping the plate to the housing. The plate further defines at least a first mounting aperture which is in alignment with the first mounting aperture on the housing of the pedal.

The first clipping means on the pedal and the pedal rack assembly comprises a clip on the housing of the pedal and a clip receiving aperture on the plate of the pedal rack assembly respectively. In one embodiment, the clip includes an arm which extends through the clip receiving aperture and is adapted to abut against the plate.

The combination pedal and pedal rack assembly of this embodiment further comprises a first fastener which extends through the aligned first mounting apertures in the housing of the pedal and the plate of the pedal rack assembly to secure the pedal to the pedal rack assembly. The combination pedal and pedal rack assembly still further comprises an alignment pin on the housing of the pedal which extends through a corresponding alignment aperture defined in the plate of the pedal rack assembly.

In the embodiment shown, first and second mounting apertures are defined in the plate and are adapted for alignment with corresponding first and second mounting apertures defined on the pedal assembly. Further, the clip includes an arm which extends through the clip receiving aperture in the plate and couples the plate to the pedal in a relationship wherein the plate is sandwiched between the arm and the pedal.

These and other objects, features and advantages will become more apparent in light of the text, drawings and claims.

BRIEF DESCRIPTION OF THE DRAWINGS

These and other features of the invention can best be understood by the following description of the accompanying drawings as follows:

FIG. 1 is a perspective view of one side of an accelerator pedal of the present invention;

FIG. 2 is a perspective view of the opposite side of the accelerator pedal of FIG. 1;

FIG. 10 is a broken, perspective view of the friction pad mounted in the housing of the accelerator pedal of FIG. 1;

FIG. 11 is another broken, perspective view of the friction pad mounted in the housing of the accelerator pedal of FIG. 1;

FIG. 12 is a perspective view of the pedal arm, the friction pad, and the spring of the accelerator pedal of FIG. 1;

FIG. 13 is a broken, perspective view of the kickdown device and kickdown lever in the housing of the pedal assembly of FIG. 1;

FIG. 16 is a simplified perspective view of the rack of FIG. 15 immediately preceding the coupling and mounting thereto to the accelerator pedal of FIG. 1;

FIG. 17 is a simplified perspective view of the rack of FIG. 15 being coupled and mounted to the accelerator pedal of FIG. 1;

FIG. 18 is a simplified perspective view of one side of the bracket of FIG. 15 in its coupled and mounted relationship to the accelerator pedal of FIG. 1;

FIG. 19 is a simplified perspective view of the opposite side of the rack shown in FIG. 15 in its coupled and mounted relationship to the accelerator pedal of FIG. 1.

DETAILED DESCRIPTION OF THE EMBODIMENT

While this invention is susceptible to embodiment in many different forms, this specification and the accompanying drawings disclose only one form of the pedal and two forms of the plate of the pedal mounting bracket or rack as examples of the invention. The invention is not intended to be limited to the embodiments so described, however.

Figure 3:
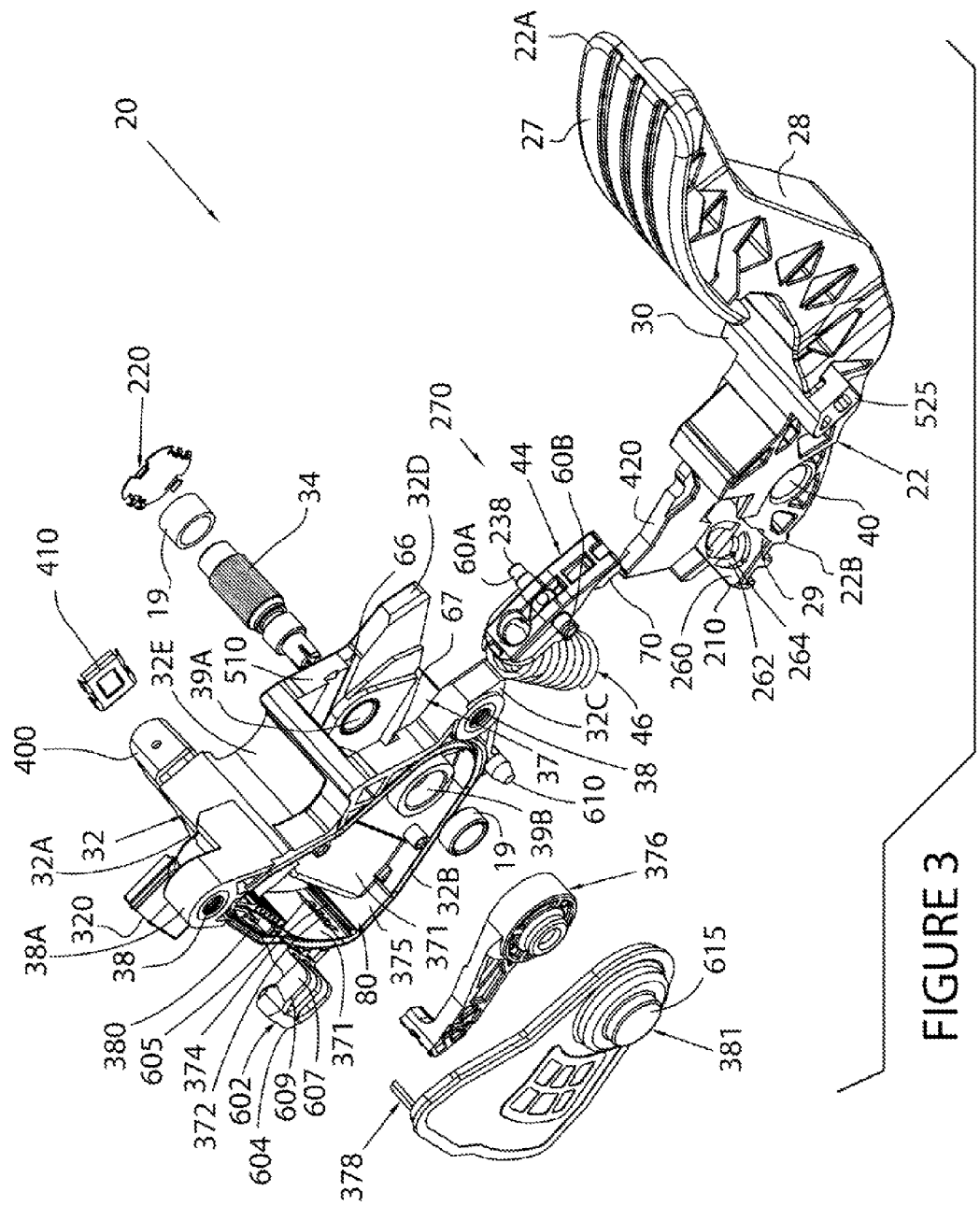
FIG. 3 is an exploded perspective view of the accelerator pedal of FIG. 1.
Figure 4:
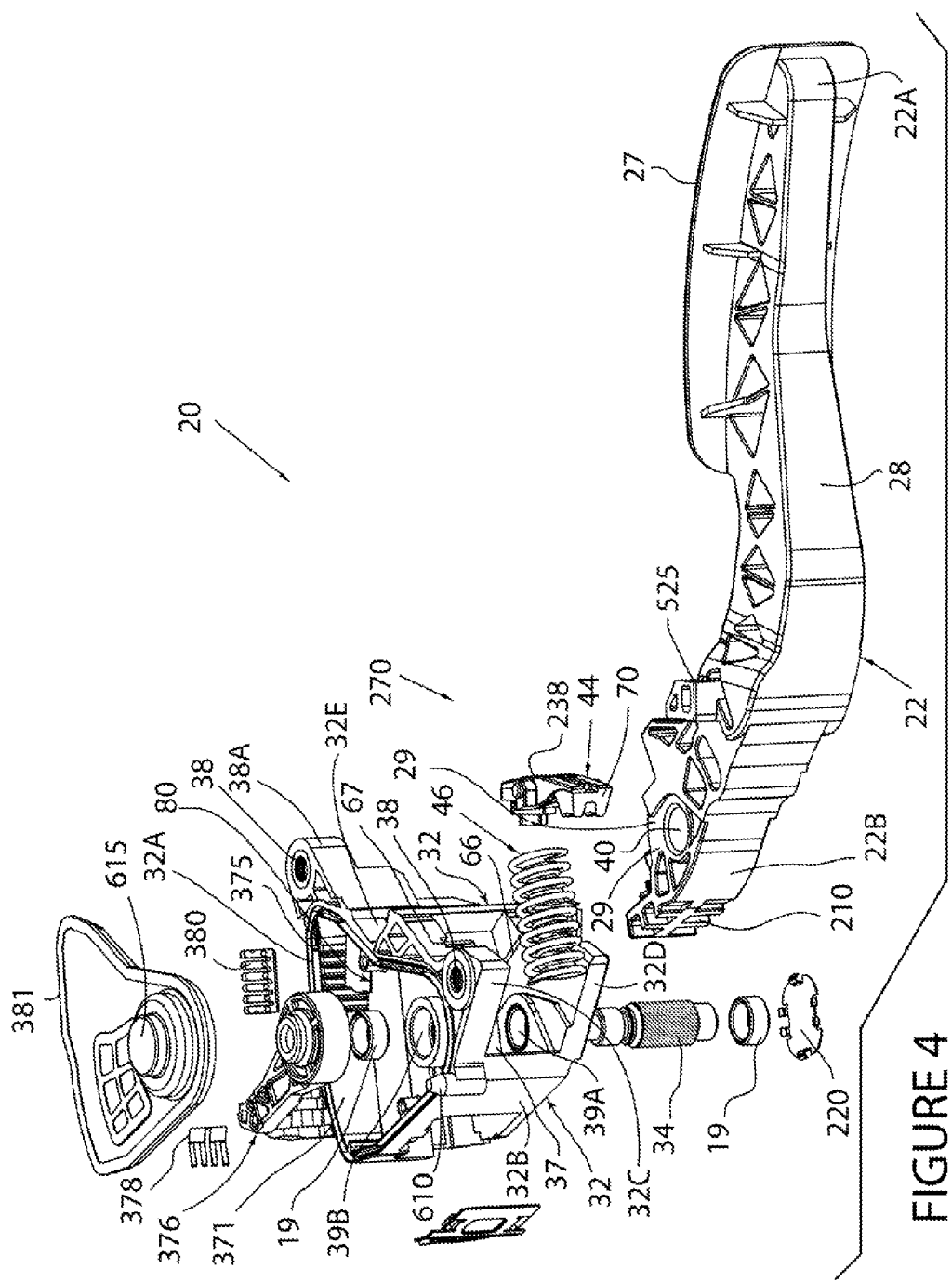
FIG. 4 is another exploded perspective view of the accelerator pedal of FIG. 1.

FIGS. 1-4 depict an accelerator pedal assembly 20 comprising, among other elements, a housing 32, a pedal arm 22 including a drum 29 rotatably mounted in a cavity 37 (FIGS. 3 and 4) of the housing 32, an elongate friction pad 44 (FIGS. 3 and 4) mounted in the cavity 37 for pivotal movement therein and engagement with the drum 29 and a bias spring device 46 (FIGS. 3 and 4).

Figure 5:
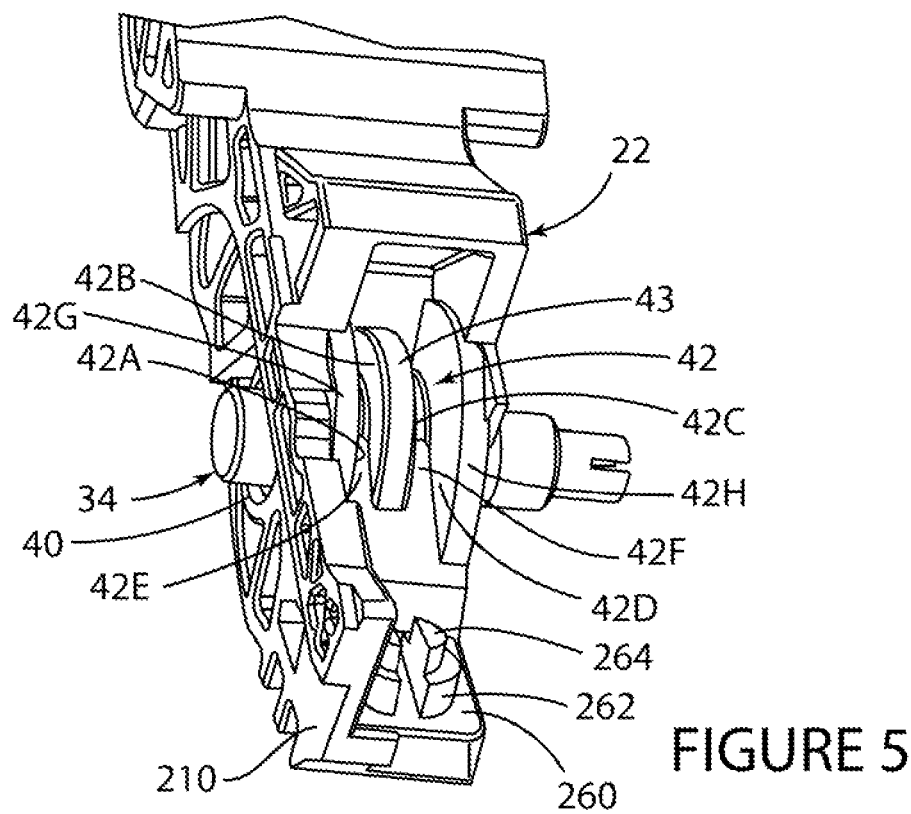
FIG. 5 is an enlarged, broken, perspective view of a portion of the accelerator pedal of FIG. 1 showing details of the friction element on the drum of the accelerator pedal arm.
Figure 6:
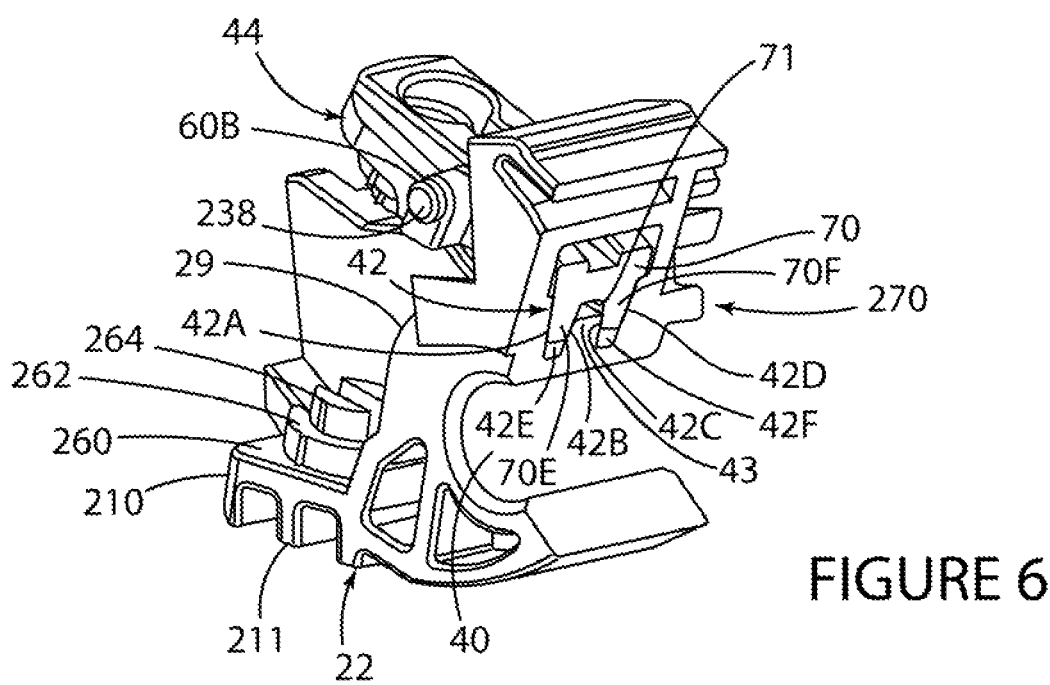
FIG. 6 is an enlarged, broken, perspective view of the accelerator pedal of FIG. 1 showing details of the interrelationship between the drum friction element and the friction pad.

The pedal arm 22 has opposed ends 22A and 22B (FIGS. 3 and 4). A footpad 27 is defined at the end 22A. Drum 29 is located at the end 22B and presents a curved, generally W-shaped slotted or grooved friction element or surface 42 (best seen in FIGS. 5 and 6) defined in part by a semi-circularly-shaped and centrally located ridge or projection or wall 43 (FIGS. 5 and 6). A lever arm 210 (FIGS. 3, 4, 5, and 6) extends outwardly from the front end of the drum 29 of the pedal arm 22.

Housing 32 defines an interior sensor section or cavity 80 (FIGS. 3 and 4) and an interior friction mechanism section or cavity 37 (FIGS. 3 and 4) separated by a housing wall 377 (FIGS. 3 and 4). A sensor arm or rotor 376 (FIGS. 3 and 4) is mounted in the sensor cavity 80 and a friction generating mechanism or assembly 270 (FIGS. 3 and 4) is mounted in the friction mechanism cavity 37.

Pedal arm 22 has a bottom face 28 and an opposed top face 30 (FIGS. 1-3). Footpad 27 may be integral with the pedal lever 22 (as shown) or articulating and rotating at its connection point to the pedal lever 22 (not shown). Pedal arm 22 also defines an aperture or through-bore 40 (FIGS. 3 and 4) which extend through the drum 29.

As shown in FIGS. 5 and 6, the friction element 42 on the drum 29 of pedal arm 22 includes a first set of respective spaced-apart and parallel friction surfaces 42A and 42B and a second set of respective spaced-apart and parallel friction surfaces 42C and 42D (FIGS. 5 and 6) that protrude generally normally outwardly from the surface of the drum 29 and together define the W-shape. The surfaces 42B and 42C are defined on the opposed side surfaces of the center ridge wall 43. The surfaces 42A and 42D are defined on respective generally semi-circularly-shaped interior walls 42G and 42H projecting outwardly from the surface of the drum 29 in a relationship spaced and parallel to the center ridge wall 43. Walls 42G and 42H are located on opposite sides of, and spaced from, the center ridge wall 43. A slot 42E is defined between the surfaces 42A and 42B and the walls 42G and 43; and a slot 42F is defined between the surfaces 42C and 42D and the walls 42H and 43. Thus, in the embodiment shown, the slots 42E and 42F are defined on opposite sides of the center ridge wall 43. Although not described herein, it is understood that the friction element 42 can have alternate shapes and configurations.

Figure 7:
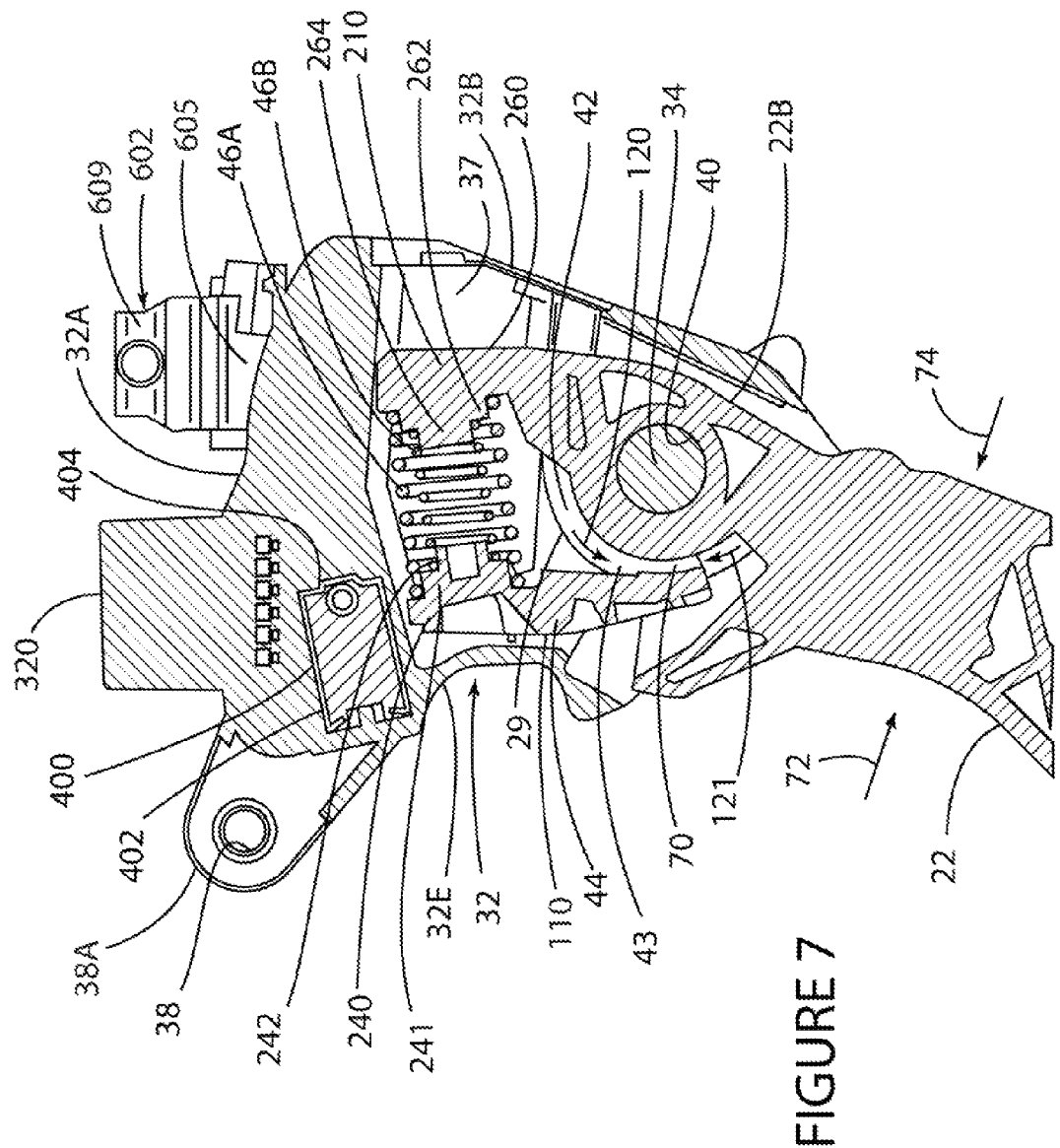
FIG. 7 is a broken, part elevational view, part vertical cross-sectional view of a portion of the interior of the accelerator pedal of FIG. 1.

Pedal arm 22 pivots in the housing 32 about and via an axle 34 (FIGS. 3 and 4) that extends through the aperture 40 defined in the drum 29 (FIG. 5). Spring device 46 biases the pedal arm 22 in an idle position. Friction pad 44 is adapted to receive one end of the spring device 46 and the lever or arm 210 of the pedal arm 22 is adapted to receive an opposite end of the spring device 46 as shown in FIGS. 7 and 12 and described in more detail below. The friction pad 44 is pivotally mounted in the housing 32 in a manner wherein a friction element 70 defined thereon is urged against the friction element 42 on the drum 29 when the pedal arm 22 is depressed as shown in FIG. 6 and as also described in more detail below.

The pedal arm 22 and, more specifically, the axle 34 thereof, is coupled to the rotor 376 in the sensor cavity 80 for creating a signal representative of the displacement of the pedal arm 22. In the embodiment shown, the sensor assembly is of the contacting variable resistance type. However, other sensors could also be used such as, for example, optical, mechanical, electrical, magnetic, or chemical sensors.

In the embodiment as shown in FIGS. 3 and 4, the housing 32 defines a base or pivot for the end 22B of pedal arm 22. Specifically, proximal end 22B of pedal arm 22 is adapted for extension into the housing cavity 37 and into and between opposed spaced-apart and parallel side walls 32C and 32D of housing 32. More specifically, the drum 29 of the pedal arm 22 includes opening 40 which receives the axle 34, while housing 32 includes friction generating cavity or section 37 with corresponding generally circular through apertures 39A and 39B (FIGS. 3 and 4) defined in the opposed housing side walls 32D and 32C respectively which receive the opposed ends of the axle 34. Axle 34 is press fit into the drum opening 40. Axle 34 includes narrowed ends defining respective collars adapted to receive respective bearing journals 19 (FIGS. 3 and 4) which are mounted in the respective housing side wall apertures 39A and 39B. One of the ends of the axle 34 extends through the opening 39B in the housing side wall 32C and into the sensor cavity 80. One end of the rotor 376 is coupled to the end of the axle 34 extending into the sensor cavity 80. A plate 220 (FIGS. 2 and 3) is mounted to the housing 32 and covers the sensor cavity 80.

Figure 8:
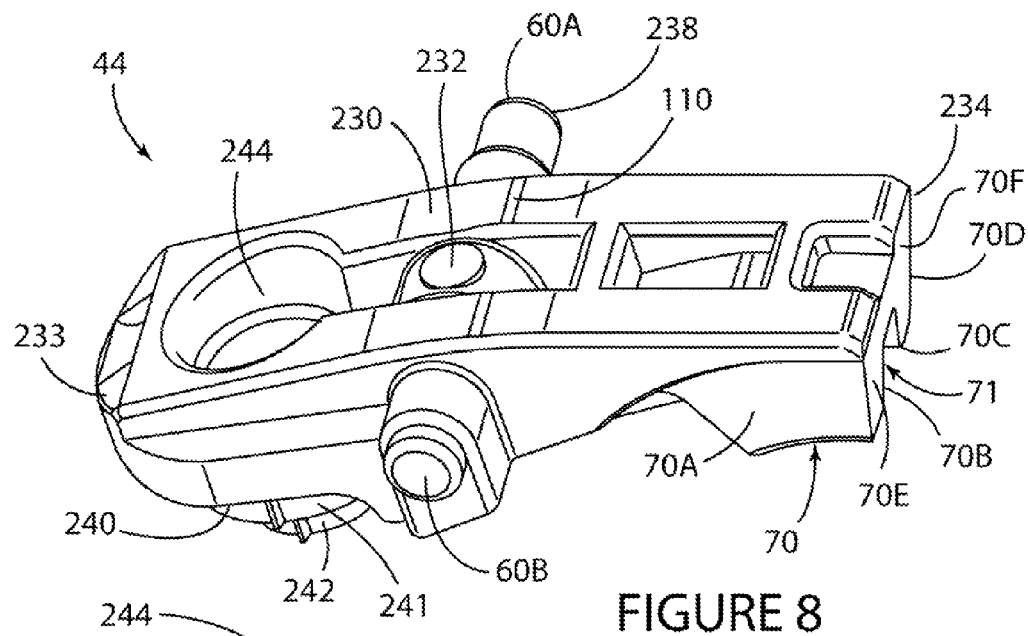
FIG. 8 is a perspective view of the top face of the friction pad of the accelerator pedal of FIG. 1.
Figure 9:
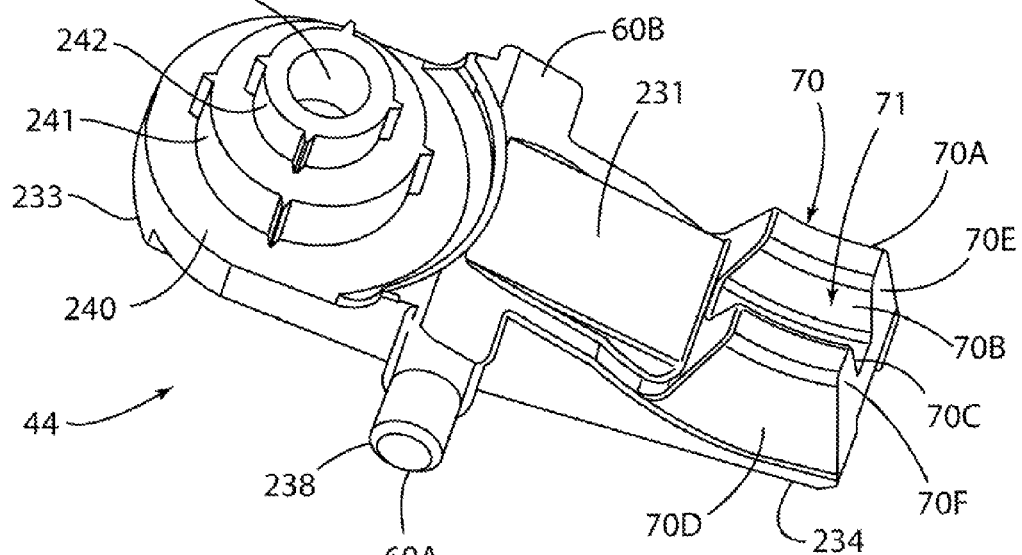
FIG. 9 is a perspective view of the bottom face of the friction pad shown in FIG. 8.

As shown in FIGS. 8 and 9, the friction pad 44 is generally in the shape of an elongate "teeter totter" like shaped plate or arm including a top face 230 (FIG. 8), a bottom face 231 (FIG. 9), and opposed ends 233 and 234. A button 232 (FIG. 8) and a ridge 110 are defined on, and project outwardly from, a central portion of the top face 230 of the friction pad 44 in a direction generally normal to the longitudinal bias of the friction pad 44.

In the embodiment shown, the contact/friction element 70 on the pad 44 is W-shaped; is located at the end 234 of the friction pad 44; and projects unitarily outwardly from the bottom face 231 of the friction pad 44. Friction element 70 includes a first finger 70E which projects outwardly from the face 231 of the pad 44 and includes opposed, spaced-apart contact/friction surfaces 70A and 70B, and a second finger 70F projecting outwardly from the face 231 of pad 44 in a relationship spaced from, and parallel to, the first finger 70E and including opposed, spaced-apart friction surfaces 70C and 70D. A slot 71 is defined between the two fingers 70E and 70F.

The contact/friction surfaces 70A-D of the friction element 70 on the friction pad 44 mate with the respective contact/friction surfaces 42A-D formed on the drum 29 of the housing 22 in a tongue and groove relationship as shown in FIG. 6, i.e., in a relationship wherein the fingers 70E and 70F of the friction element 70 extend into the respective slots 42E and 42F defined on the drum 29 of the pedal arm 22 and the ridge wall 43 on the drum 29 of the pedal arm 22 extends into the slot 77 of the friction element 70.

The friction pad 44 also includes trunnions 60A and 60B (also called outriggers or flanges) extending and protruding outwardly from opposed sides thereof and together defining a primary friction pad pivot axis 238 (FIGS. 3, 8, and 9).

The friction pad 44 further includes a base 240 (FIGS. 7, 8, and 9) and a pair of collars 241 and 242 projecting outwardly from the face 231 thereof at the end 233 thereof opposite the end 234 with the friction element 70. Collar 241 projects outwardly from the base 240. Collar 242 has a diameter smaller than the diameter of collar 241 and projects outwardly from the top of the collar 241. A cavity 244 is defined in the interior of the collar 242.

Bias spring device 46 (FIGS. 3, 4, and 7) includes bias coil springs 46A and 46B (FIGS. 4 and 7). Spring 46A is larger in diameter than spring 46B. Springs 46A and 46B are co-axial and spring 46B is located inside the spring 46A (FIG. 7) and provides redundancy in the event of the failure of one of the springs 46A and 46B. As described in more detail below, the springs 46A and 46B are located and mounted in the housing cavity 37 in a relationship as shown in FIG. 7 wherein one end of the spring 46A surrounds the collar 241 on the friction pad 44 and is seated against the base 240 of the friction pad 44, and one end of the spring 46B surrounds the collar 242 on the friction pad 44 and is seated against the top of the collar 241 of the friction pad 44.

A pair of elongate, co-planar slots 66 and 67 (FIG. 3) are defined in the interior surface of the opposed side walls 32D and 32C respectively of housing 32 and are adapted to receive the respective, generally cylindrically-shaped trunnions 60A and 60B of the friction pad 44 when the friction pad 44 is inserted and mounted in the housing cavity 37. The slots 66 and 67 are positioned in a relationship adjacent but spaced from the housing top wall 32E.

Housing 32 additionally includes a top wall 32E (FIGS. 2, 3, and 7) located between and connecting the two side walls 32C and 32D and defining the roof of the interior housing cavity 37. The inner surface of top wall 32E includes an interior shoulder (not shown) against which the ridge 110 of friction pad 44 is adapted to rest when friction pad 44 is mounted in the housing cavity 37 of housing 32. The interior shoulder also defines a secondary pivot axis for the friction pad 44.

Lever 210 on the pedal arm 22 includes a distal base 260 (FIGS. 3, 5, and 7), a first collar 262 (FIGS. 3, 5, and 7) projecting outwardly from the top of the base 260, and a second collar 264 projecting outwardly from the top of the collar 262. Collar 264 has a smaller diameter than the collar 262.

As shown in FIG. 7, the pedal arm 22 is mounted in the housing 32 in a relationship wherein the lever 210 and, more specifically, the base 260 thereof, extends into the housing cavity 37 and is positioned in a relationship adjacent the base plate or wall 32B of housing 32 with the base 260 and collars 262 and 264 facing the top wall 32E of housing 32.

As also shown in FIGS. 3 and 7, the friction pad 44 is mounted in the cavity 37 of the housing 32 in the space defined between the top of the drum 29 and the interior surface of the top housing wall 32E in a relationship in which: the ridge 110 (FIG. 8) is abutted and seated against the interior surface of the housing top wall 32E; trunnions 60A and 60B thereon are located in the slots 66 and 67 defined in respective housing side walls 32D and 32C, thus allowing the friction pad 44 to pivot in the housing cavity 37 about the slots 66 and 67 and the trunnions 60A and 60B; the friction pad 44 is positioned in a relationship spaced, parallel to, and co-planar with the pedal lever arm 210; the collars 241 and 242 on the base 240 of friction pad 44 face, and are positioned in an opposed, spaced-apart, and co-linear relationship with the collars 262 and 264 on the base 260 of the pedal lever arm 210; and the fingers 70E and 70F of the friction element 70 on the friction pad 44 extend into the respective slots 42E and 42F in the friction element 42 on the drum 29 of the pedal arm 22 for generating friction between the friction pad 44 and the drum 29 as described in more detail below.

As further shown in FIG. 7, the springs 46A and 46B are located in the housing cavity 37 in front of the drum 29 (i.e., between the drum 29 and the back wall 32A of the housing 32) and are sandwiched between, and in contact with, the friction pad 44 at one end and the pedal lever arm 210 at the other end and, more specifically, the respective ends of the springs 46A and 46B are in contact with the respective collars on the friction pad 44 and the pedal arm lever 210.

Thus, in the embodiment as shown in FIG. 7, the lever arm 210 is located in the housing cavity 37 adjacent the housing base wall 32B; the friction pad 44 is located in the housing cavity 37 between the housing top wall 32E and the drum 29 in a relationship spaced and generally parallel to the lever arm 210; and the springs 46A and 46B extend in the housing cavity 37 between and in contact with the lever arm 210 and the friction pad 44 in a relationship generally normal to both the lever arm 210 and the friction pad 44.

As the pedal arm 22 is rotated in a first counter-clockwise direction 72 (for acceleration) or the other clockwise direction 74 (for deceleration) as shown in FIG. 7, the pedal lever 210 is moved respectively either away from (counter-clockwise), or towards (clockwise), the base wall 32B of the housing 32 to respectively either increase or decrease the force exerted by the lever 210 against the compression springs 46A and 46B which, in turn, either pivots the friction element 70 on the friction pad 44 either further into or away from the friction element 42 on the drum 29 of pedal arm 22.

More specifically, as the pedal arm 22 moves towards the idle/decelerate position (direction 74 in FIG. 7), the resulting friction between the friction element 42 on the drum 29 and the friction element 70 on the friction pad 44 urges the friction pad 44 towards a position in which the trunnions 60A and 60B are moved slightly outwardly in the slots 66 and 67 in the direction of the drum 29. As the pedal arm 22 is depressed (direction 72 in FIG. 7), the friction between the friction element 42 on the drum 29 and the friction element 70 on the pad 44 and, more specifically, the friction between the respective contacting surfaces thereof, draws the friction pad 44 further rearwardly into the cavity 37 and away from the drum 29 and causes the trunnions 60A and 60B to move further rearwardly into the slots 66 and 67 in the direction of the housing back wall 32A. The sliding motion of the friction pad 44 is gradual and creates a "wedging" effect that either increases or decreases the force urging friction element 70 on the pad 44 into the friction element 42 on the drum 29, thus creating a directionally dependent hysteresis effect which approximates the feel of a conventional mechanically-linked accelerator pedal.

Still more specifically, when the pedal force on the pedal arm 22 is increased, the pedal lever arm 210 rotates counter-clockwise, which causes the compression of springs 46A and 46B which, in turn, causes the springs 46A and 46B to exert a force against the end 233 of the friction pad 44 which, in turn, causes the friction pad 44 to pivot counter-clockwise in the housing cavity 37 which, in turn, urges the friction pad 44 and, more specifically, the trunnions 60A and 60B further inwardly into the respective slots 66 and 67 by the frictional force created on the friction element 70 as the friction element 42 rotates forward towards the drum 29 (direction 120 in FIG. 7), whereby the normal friction force of the friction element 70 on the pad 44 into the friction element 42 on the drum 29 is relatively reduced.

In a like manner, when the pedal force on the pedal arm 22 is reduced, the opposite effect is present: the pedal lever arm 210 rotates clockwise, which causes the extension of the springs 46A and 46B which, in turn, reduces the force exerted by the springs 46A and 46B on the end 233 of the friction pad 44 which, in turn, causes the friction pad 44 to pivot clockwise in the housing cavity 37 which, in turn, urges the friction pad 44 and, more specifically, the trunnions 60A and 60B outward from the respective slots 60A and 60B (direction 121 in FIG. 7) such that the normal direction contact or friction force between the respective friction surfaces of the friction element 42 and the friction element 70 is relatively increased. The relatively higher contact or friction force present as the pedal force on the pedal arm 22 decreases allows a driver to hold a given throttle position with less pedal force than is required to move the pedal arm for acceleration.

The W-shape of the friction element 42 and the friction element 70 and, more specifically, the tongue-in-groove inter-coupling between the respective walls or fingers thereof, provides and creates larger areas or surfaces for friction generation.

With reference to FIGS. 10-13, pedal arm 22 includes an idle, return position stop and a depressed, open-throttle position stop.

Open throttle position stop is defined by respective pedal arm posts 525 (FIGS. 10 and 12) that are located on the pedal arm 22 aft of the drum 29 and project outwardly from opposed sides of the pedal arm 22; and complementary stop shoulders 530 (FIGS. 10 and 11) defined at the front of the respective side walls 32C and 32D of the housing 32. When the pedal arm 22 is fully depressed, the pedal arm posts 525 contact the stop shoulders 530 and prevent the further counter-clockwise forward movement of the pedal arm 22. Stops 500 and 520 may be elastomeric or rigid.

Idle position stop comprises the combination of shoulder 510 (FIGS. 11 and 13) at the front of housing top wall 32E and a shoulder or wall 505 (FIGS. 10 and 13) on the pedal arm 22 which projects outwardly from the top surface of the drum 29 located fore of the posts 525. When pedal arm 22 is released, pedal arm shoulder 505 comes into contact with the housing wall shoulder 510, thereby preventing any further clockwise movement of the pedal arm 22 in direction 74 (FIG. 7).

Sensor assembly, as shown in FIGS. 3 and 4, includes a strip of Kapton flexible film 371 that includes respective resistor tracks 372 and conductor tracks 374 (FIG. 3). The film 371 is located in the sensor cavity 80 and rests against the interior surface of the housing back wall 32A. One end of the film 371 is located in a slot (not shown) defined in the housing back wall 32A. Terminals (not shown) are insert molded into the housing 32 and project into the sensor cavity 80. The terminals extend into a connector shroud 320 and are couplable to a wire harness (not shown). A metal pressure wedge 380 (FIGS. 3 and 4) is pressure fit into the slot (not shown) for making electrical connections between the conductor tracks 374 and the terminals (not shown).

As described above, rotor 376 is press fitted to the end of axle 34 protruding into the sensor cavity 80. Rotor 376 has contactors or wipers 378 (FIGS. 3 and 4) attached to a distal end thereof. Although not shown, it is understood that, in operation, rotor 376 rotates in response to rotation of the axle 34 in response to the movement of the pedal arm 22. The rotation of the rotor 376 causes the contactors 378 to move along the resistor tracks 372 and the conductor tracks 374. As the contactors 378 move, a voltage applied to the terminals changes in magnitude and generates an electrical output signal which is indicative of the position of the rotor 376 and, in turn, the position of the axle 34 and, in turn, the position of the pedal arm 22.

Additional details on the operation and construction of sensor assembly 80 are detailed in U.S. Pat. Nos. 5,416,295 and 6,474,191, the contents of which are specifically herein incorporated by reference in their entirety.

Housing 32 further includes a kickdown clip opening or cavity or pocket 402 (FIG. 7) located in the housing cavity 37 aft of the springs 46A and 46B and fore of the interior surface of housing back wall 32A, i.e., between the springs 46A and 46B and the housing back wall 32A. A kickdown clip 400 (FIGS. 7, 10, 11, and 13) is mounted in the pocket 402 in a relationship wherein one end of the clip 400 is abutted against the interior surface of the housing top wall 32E and the opposed end, including a depressable button 404, projects into the housing cavity 37 and faces the housing base wall 32B.

Pedal arm 22 also includes an extended generally vertical kickdown clip activation lever or arm or wall 420 (FIGS. 3, 12, and 13) which has a top engagement surface or ledge 422. The arm 420 projects outwardly from the front of the drum 29 in a relationship adjacent the friction assembly lever arm 210 and, more specifically, in a relationship adjacent and spaced from the base 260 thereof.

As shown in FIG. 13, the kickdown clip activation arm 420 extends into housing cavity 37 and is adapted to swing counter-clockwise therein in response to the depression of the pedal arm 22 which, in turn, causes the top engagement surface 422 thereof to engage and depress the button 404 of kickdown clip 400.

Additional details on the operation and construction of kickdown clip 400 are detailed in U.S. Pat. No. 6,418,813, entitled, "Kickdown Mechanism for a Pedal", the contents of which are specifically herein incorporated by reference in their entirety.

Kickdown clip 400 provides a tactile feedback to the pedal operator that the pedal is at a maximum point of depression. The maximum point of pedal depression can correspond to a wide open engine throttle position or can be used to indicate a downshift point for an automatic transmission.

When a pedal operator lifts his foot from footpad 27, the loaded bias spring device 46 causes the pedal arm 22 to rotate about the axle 34 back to the original starting position. This position corresponds to an idle engine throttle position.

When the footpad 27 is depressed, an increasing normal force is exerted by the friction element 70 on the friction pad 44 against the friction element 42 on the drum 29 of the pedal arm 22. A friction force between the respective friction elements 70 and 42 is defined by the coefficient of dynamic friction multiplied by normal force. As the normal force increases with increasing applied force at footpad 27, the friction force accordingly increases. The driver feels this increase in his/her foot at footpad 27. Friction force runs in one of two directions along friction element 70 depending on whether the pedal lever 210 is pushed forward in the direction 72 or rearward in the direction 74 (FIG. 7). The friction force opposes the applied force as the pedal is being depressed and subtracts from the spring force as the pedal is being returned toward its idle position.

The pedal assembly 20 of the present invention can have a directionally dependent actuation-force hysteresis. Initially, a larger amount of force may be required to start movement of pedal arm 22. A smaller amount of force may then be needed to keep moving pedal arm 22.

Pedal assembly 20 may further have a no-movement zone that allows the driver to reduce foot pedal force while still holding the same accelerator pedal position.

Figure 14:
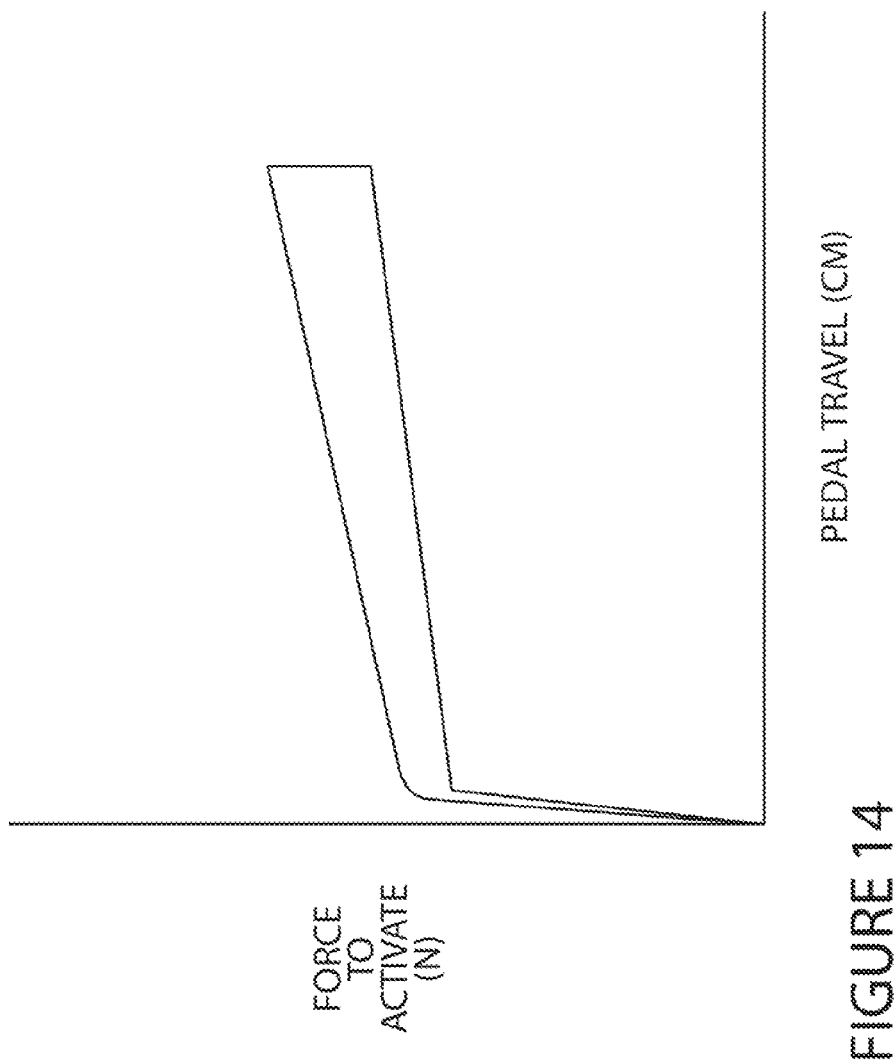
FIG. 14 is a force diagram demonstrating the tactile response of the accelerator pedal.

FIG. 14 shows a graph of force versus pedal arm travel demonstrating the directionally dependent actuation-force hysteresis provided by accelerator pedal assembly 20 of the present invention. In an embodiment, pedal force can be reduced 40 to 50 percent before pedal arm 22 begins to move towards an idle position.

The pedal assembly 20 is securable to the pedal mounting plate 700 of a pedal mounting bracket or rack 800. The plate 700 is secured to the pedal 20 via a pair of fasteners 730 (FIGS. 17 and 20) extending through the plate 700 and into a first mounting aperture 38 defined in a first mounting bracket 38A protruding outwardly from the housing 32 in the region thereof wherein the housing walls 32A and 32E meet (FIGS. 2, 7, 11, and 13) and a second mounting aperture 38 defined in a second mounting bracket 38A defined in the housing wall 32C (FIGS. 1, 3, 4, 11, and 20).

The pedal assembly 20 is adapted for mounting or clipping to the plate 700 of the rack 800 by means of a bracket or clip 602 (FIGS. 1, 2, 3, 7, 10, 13, 16, 17, 18, 19, and 20) and a pin 610 (FIGS. 1, 3, 4, 11, 13, 16, 18, and 20) which are both formed on the housing 32 of the pedal 20. The clip 602 projects outwardly from the side or wall 32A of housing 32 adjacent the corner of housing 32 wherein the housing walls 32A and 32B meet. In the embodiment shown, bracket or clip 602 is in the form of a generally L-shaped arm or hook 604 which includes a first arm portion 605 which protrudes outwardly from the wall 32A of housing 32, an elbow 607 at the end of the first arm portion 605, and a second arm portion 609 which projects from the elbow 607 in a relationship generally normal to the first arm portion 605 and spaced from the side or wall 32A of housing 32 and includes a round pin 606 which protrudes outwardly from a distal end of the exterior surface of the second arm portion 609 and faces the connector shroud 320. The pin 610 projects outwardly from a side of the wall 32B of the housing 32 and extends in the direction of the cover 381.

Figure 15:
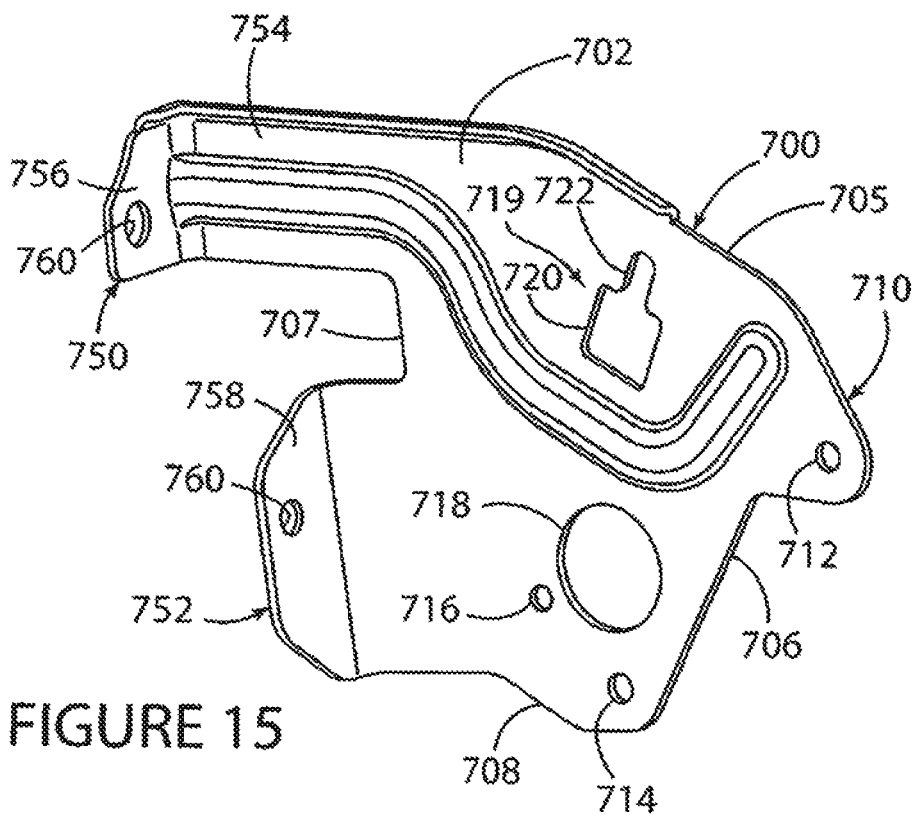
FIG. 15 is a perspective view of a pedal mounting bracket or rack incorporating a pedal mounting plate in accordance with the present invention.

One embodiment of a pedal mounting bracket or rack 800 incorporating the pedal mounting plate 700 in accordance with the present invention is shown in FIG. 15. The plate 700 is generally flat and includes front and back faces 702 and 704 (FIGS. 15 and 19), top and bottom edges 705 and 708, and opposed front and back edges 706 and 707. Front edge 706 includes an outwardly projecting finger 710 defined adjacent the top edge 705 of the plate 700. A generally round mounting or fastener aperture 712 is defined in the finger 710 of the plate 700. A pair of apertures 720 and 722 are defined in, and extend through, the plate 700 and together define a clip receiving means or receptacle or bracket 719. Apertures 720 and 722 are generally located in the upper right hand corner of the plate 700. Aperture 722 is located on plate 700 between the aperture 720 and the top edge 705 of the plate 700. Aperture 720 which, in the embodiment shown, is generally square-shaped, is larger than the aperture 722 and, in the embodiment shown, is generally oval-shaped and opens into the top edge of the aperture 720 to define a generally keyhole-shaped continuous bracket aperture or opening 719.

Plate 700 further defines three additional generally round apertures 714, 716, and 718 located adjacent the bottom edge 708 of the plate 700. Aperture 708 is larger than the apertures 714 and 716. Apertures 714 and 716 are spaced from each other and are located on the plate 700 between the aperture 718 and the bottom edge 708 of plate 700. Apertures 712, 714, and 716 are all generally the same size. Aperture 714 defines a mounting or fastener aperture. Aperture 716 defines a locating aperture.

A pair of generally L-shaped vehicle mounting bracket arms 750 and 752 protrude unitarily outwardly from the back edge 707 of the plate 700. The bracket arm 750 extends from an elongate arm 754 which projects outwardly from the back edge 707 of the plate 700 and thus is positioned in a relationship spaced both horizontally and vertically from the bracket arm 752. The bracket arm 750 includes a plate 756 which extends generally unitarily normally outwardly from the distal end of the arm 754 and the surface 702 of the plate 700. The bracket arm 752 includes a plate 758 which extends generally unitarily normally outwardly from the back edge 707 and the surface 702 of the plate 707. The plates 756 and 758 of respective brackets 750 and 752 each define a through aperture 760.

Figure 15A:
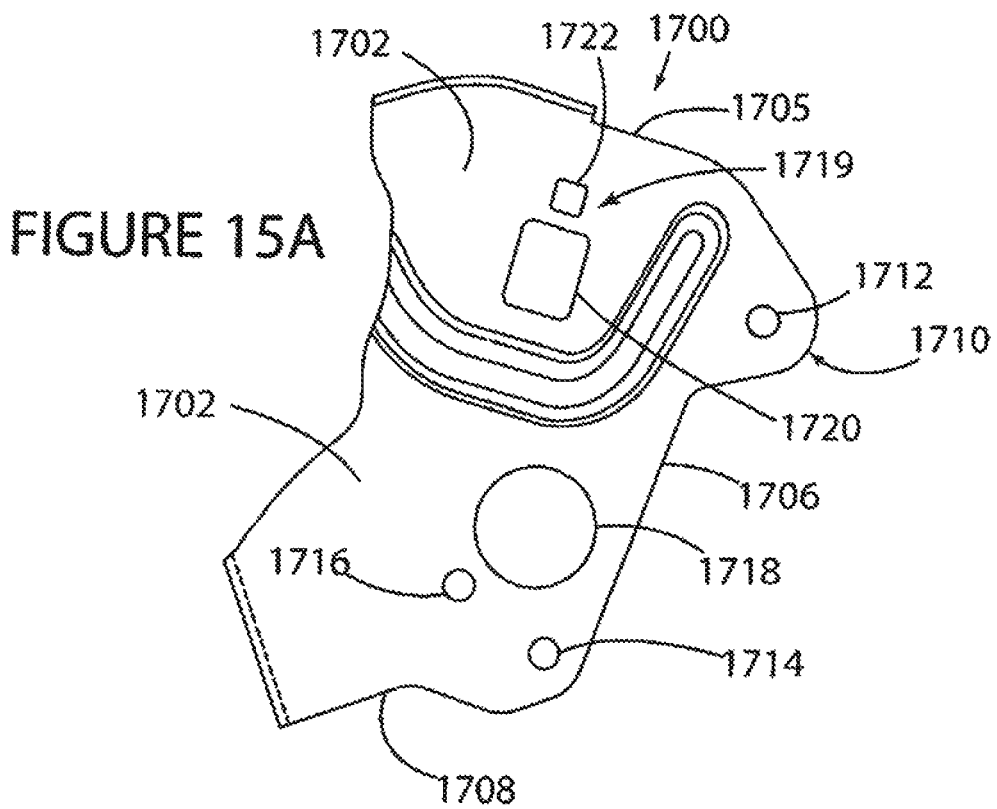
FIG. 15A is a perspective view of another embodiment of a pedal mounting bracket or rack incorporating another embodiment of a pedal mounting plate.

Another embodiment of a pedal mounting bracket or rack 1800 incorporating a pedal mounting plate 1700 is shown in FIG. 15A which is identical in all respects to the pedal bracket 800 except that the clip receiving means or receptacle or bracket 719 defined in the pedal mounting plate 700 has been substituted with a clip receiving means or receptacle or bracket 1719 comprising separate spaced-apart apertures 1720 and 1722 rather than combined apertures 720 and 722 as in FIG. 15.

Specifically, it is initially noted that the two vehicle mounting bracket arms 750 and 752 of the bracket 800 shown in FIG. 15 have not been shown in FIG. 15A since they are identical to those shown in the pedal bracket 800 of FIG. 15 and thus the description thereof is incorporated herein by reference. Additionally, it is understood that the plate 1700 is otherwise similar to the plate 700 and specifically includes a front face 1702, a back face (not shown but similar to the back face 704 of the plate 700), top and bottom edges 1705 and 1708, a front edge 1706 and a back edge (not shown). Front edge 1706 includes an outwardly projecting finger 1710 defined adjacent the top edge 1705 of the plate 1700. A generally round aperture 1712 is defined in the finger 1710 of plate 1700.

Aperture 1720 is a generally square-shaped aperture 1720 and is located in the upper right hand corner of the plate 1700. A smaller generally square-shaped aperture 1722 is spaced from the aperture 1720. The aperture 1722 is located in the plate 1700 between the aperture 1720 and the top edge 1705 of the plate 1700. The apertures 1720 and 1722 are located in a generally co-linear relationship.

Plate 1700 further defines three additional generally circular apertures 1714, 1716, and 1718 located adjacent the bottom edge 1708 of the plate 1700. Aperture 1718 is larger than the apertures 1714 and 1716. Apertures 1714 and 1716 are spaced from each other and are located on the plate 1700 between the aperture 1718 and the bottom edge 1708 of plate 1700. Apertures 1712, 1714, and 1716 are all generally the same size.

The pedal racks 800 and 1800 are adapted for coupling or clipping or hooking to the housing 32 of pedal assembly 20. FIGS. 16-20 depict the rack 800 coupled to the pedal 20 into a relationship wherein the back face 704 of the plate 700 thereof is abutted against the cover 381 of the housing 32.

As shown in FIGS. 16 and 17, the coupling or clipping or hooking of the pedal bracket 800 to the pedal housing 32 includes at least the following steps: the positioning of the rack 800 and the pedal 20 in the relationship as shown in FIG. 16 wherein the pedal 20 is located opposite and spaced from the face 704 of the plate 700; bringing the rack 800 and the pedal 20 together and extending or inserting or hooking the clip 602 on the housing 32 through the clip receiving keyhole 719 in the plate 700 and, more specifically, through the aperture 720 in the plate 700; rotating the plate 700 counter-clockwise relative to the pedal 20 into a relationship wherein the back face 704 of the plate 700 is abutted against the outside surface of the cover 381 of the pedal housing 32 (FIGS. 18, 19, and 20), the locating pin 610 on the housing 32 projects and extends through the aperture 716 in the plate 700 (FIGS. 18 and 20), the mounting or fastener apertures 712 and 714 in the plate 700 are aligned with the respective mounting through-holes or apertures 38 in the bracket 38A and housing wall 32C on the pedal housing 32 (FIGS. 18 and 20), the circular protuberance 615 defined in the cover 381 of the housing 32 protrudes and extends into and through the aperture 718 in the plate 700 (FIGS. 18 and 20), the interior surface of the second arm portion 609 of the clip 602 is abutted against the front face 702 of the plate 700 (FIGS. 18 and 20), and the locating pin 606 on the clip 602 is slid into the aperture 722 in the plate 700 and protrudes outwardly from the back face 704 of the plate 700 (FIG. 19); and the fasteners 730 extend through the respective apertures 712 and 714 in the plate 700 and the respective housing apertures 38 aligned therewith to fasten the rack 800 to the pedal 20.

Figure 20:
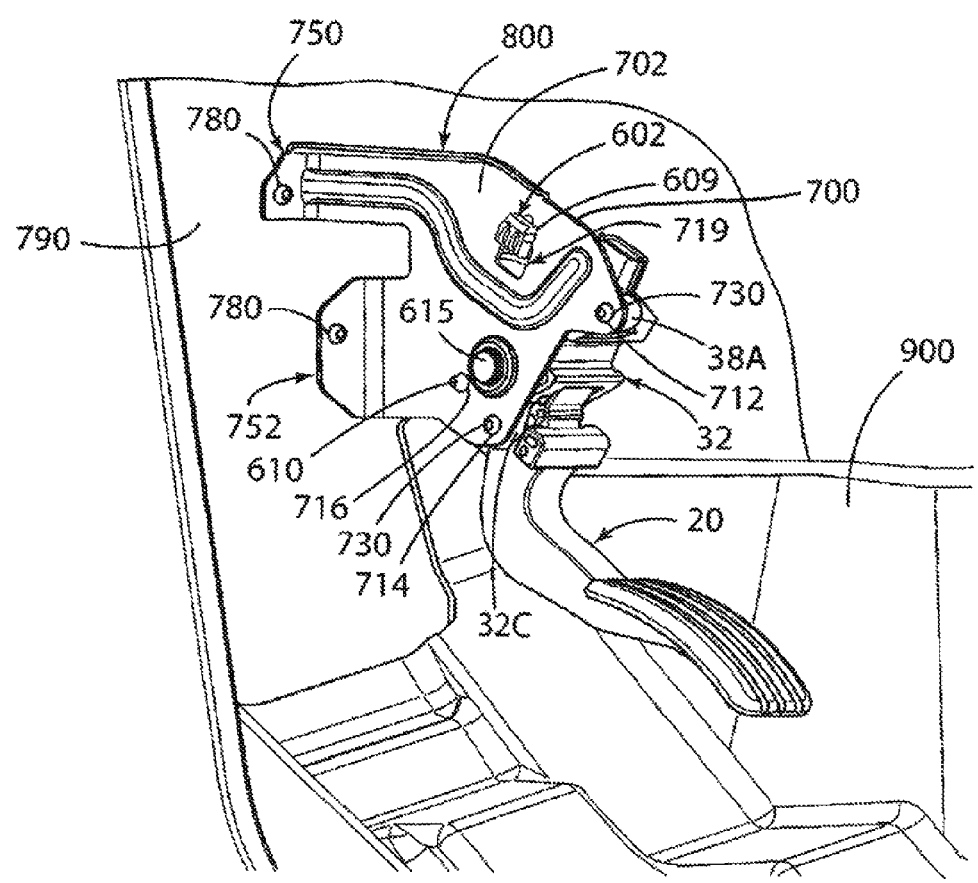
FIG. 20 is a simplified, broken, perspective view depicting the combination pedal/rack mounted to the firewall of a vehicle.

Thus, as shown in FIG. 20, when the rack 800 is coupled to the pedal 20, the plate 700 of the rack 800 is located between the clip 602 and the pedal housing 32 and, more specifically, is sandwiched or wedged between the second arm portion 609 of the clip 602 and the outside surface of the cover 381 of the pedal housing 32.

As shown in FIG. 20, it is understood that the combination pedal/rack assembly is then adapted to be secured to the firewall 790 in the interior of the vehicle 900 in a relationship wherein the back face of the respective bracket arms 750 and 752 of the bracket 800 are abutted against the front face of the vehicle firewall 790 and respective fasteners 780 are extended through the respective apertures 760 defined in the respective bracket arms 750 and 752 for securing the combination pedal/rack assembly to the vehicle firewall 790 in a relationship wherein both the bracket 800 and the pedal 20 are disposed in a relationship generally normal to the vehicle firewall 790.

Numerous variations and modifications of the embodiments described above may be effected without departing from the spirit and scope of the novel features of the invention. It is to be understood that no limitations with respect to the specific pedal illustrated herein are intended or should be inferred. It is, of course, intended to cover by the appended claims all such modifications as fall within the scope of the claims including, for example, the combination pedal/rack assembly where the plate 700 instead of the pedal includes the clip 602 and the housing 32 of the pedal 20 defines the aperture or bracket adapted to receive the clip 602 on the plate 700.

What is claimed is:

1. A pedal assembly comprising:
   a pedal arm mounted in a housing, the pedal arm being pivotable in the housing about a pivot axis;
   a pedal mounting rack including a plate having opposed faces, the plate being oriented in a relationship normal to the pivot axis of the pedal arm;
   a clip aperture defined in the plate and adapted to receive an L-shaped clip on the housing, the L-shaped clip including a first arm portion protruding outwardly from the housing and a second arm portion projecting in a relationship generally normal to the first arm portion;
   a locating pin aperture defined in the plate and adapted to receive a locating pin on the housing; and
   a fastener aperture defined in the plate adapted for alignment with a fastener apertures defined on the housing.

2. A pedal assembly comprising:
   a pedal arm mounted in a housing with a wall and defining cavity, the pedal arm pivoting in the cavity of the housing about a pivot axis;
   a pedal mounting rack including a plate, the plate being oriented in a relationship normal to the pivot axis of the pedal arm;
   a clip projecting outwardly from the wall of the housing, the clip protruding outwardly from the wall of the housing and a pin protruding outwardly from a distal end of an arm portion of the clip; and
   first and second apertures defined in the plate of the pedal mounting rack, the first and second apertures both extending through the plate and together defining a bracket aperture for the clip, the arm portion of the clip extending through the first aperture in the plate and the pin on the arm portion of the clip extending through the second aperture in the plate for mounting the housing to the mounting rack.

3. The pedal assembly of claim 2 wherein the second aperture opens into the first aperture and together form a keyhole-shaped bracket aperture for the clip.

4. The pedal assembly of claim 2 further comprising a first fastener extending through aligned first mounting apertures in the housing and the plate of the pedal mounting rack for securing the housing to the pedal mounting rack.

5. The pedal assembly of claim 2 further comprising a locating pin projecting outwardly from the housing and extending through a corresponding locating aperture defined in the plate of the pedal mounting rack.

* * * * *